United States Patent [19]

Medbury

[11] Patent Number: 4,759,847
[45] Date of Patent: * Jul. 26, 1988

[54] FILTER FOR THE SORPTION OF A PETROLEUM PRODUCT FROM A LIQUID

[76] Inventor: Seward J. Medbury, 28785 Oak Point, Farmington Hills, Mich. 48018

[*] Notice: The portion of the term of this patent subsequent to Apr. 23, 2002 has been disclaimed.

[21] Appl. No.: 675,076

[22] Filed: Nov. 26, 1984

Related U.S. Application Data

[63] Continuation-in-part of Ser. No. 557,863, Dec. 5, 1983, Pat. No. 4,512,890.

[51] Int. Cl.$^4$ ............................................. B01D 15/00
[52] U.S. Cl. ................................ 210/484; 210/494.1; 210/502.1; 210/505; 210/924
[58] Field of Search ............. 210/671, 680, 691, 799, 210/400, 401, 483, 484, 502.1, 506–508, 924, 494.1, 505; 428/6, 234

[56] References Cited

U.S. PATENT DOCUMENTS

| | | | |
|---|---|---|---|
| 1,486,858 | 3/1924 | Blocksom | 428/234 |
| 2,365,502 | 12/1944 | Weesner | 428/6 |
| 2,720,909 | 10/1955 | Ehrlich | 428/6 |
| 3,617,555 | 11/1971 | Ginsburgh et al. | 210/671 |
| 3,668,118 | 6/1972 | Rhodes | 210/671 |
| 4,439,324 | 3/1984 | Crotti | 210/691 |

OTHER PUBLICATIONS

Sittig, M. "Oil Spill Prevention and Removal Handbook", Noyes Data Corp., 1977, p. 392.

Primary Examiner—Ivars Cintins
Attorney, Agent, or Firm—Brooks & Kushman

[57] ABSTRACT

A filter including a flexible mesh having feathers secured thereto is disclosed for separating out oil from an oily liquid. The feathers sorb the oil. In a first embodiment of the filter the feathers are adhesively secured to the mesh. In a second embodiment of the filter, portions of a fibrous polyester layer extend through the feathers and the mesh to secure the feathers to the mesh in fixed positions. A filter assembly, including a plurality of filters supported by a movable conveyor in spaced relationship, is also disclosed.

15 Claims, 3 Drawing Sheets

U.S. Patent   Jul. 26, 1988   Sheet 1 of 3   4,759,847
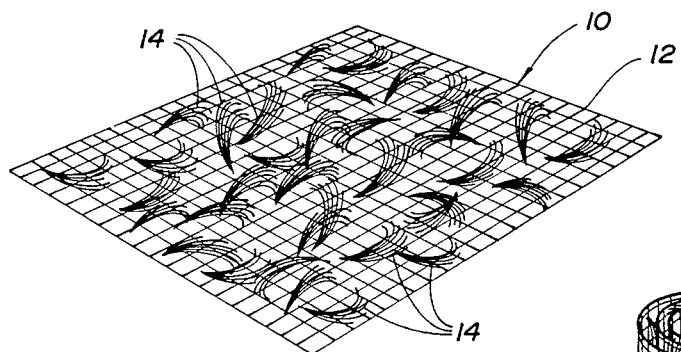
Fig. 1
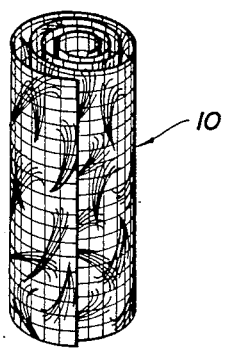
Fig. 2
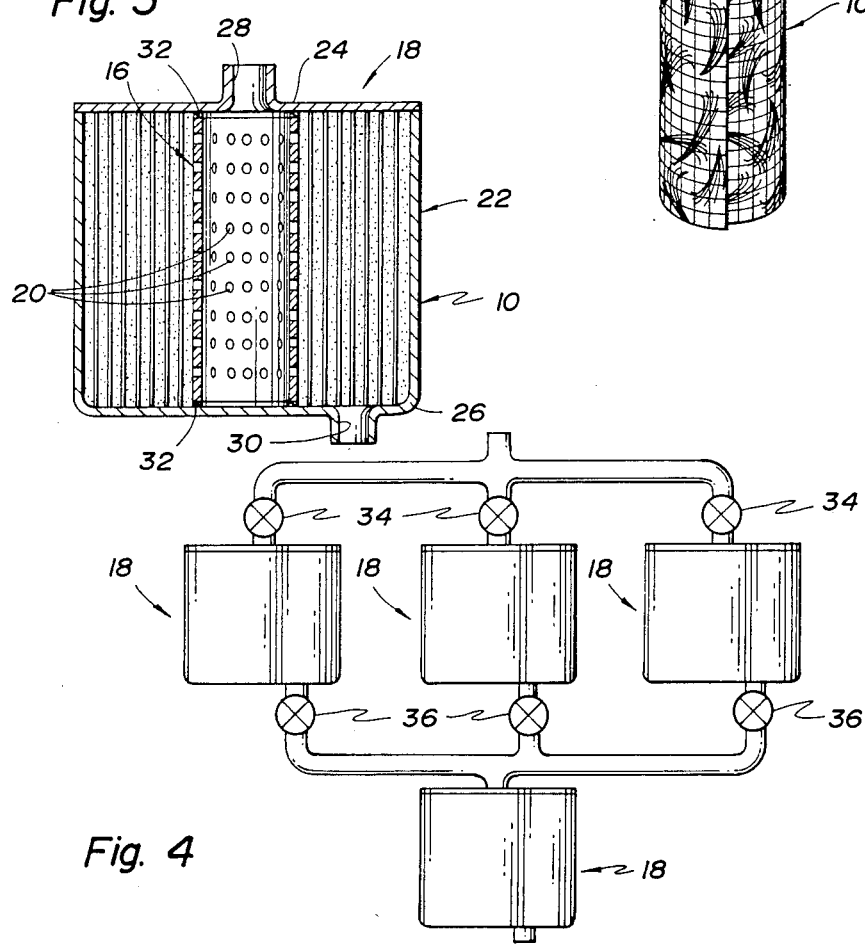
Fig. 3
Fig. 4

FILTER FOR THE SORPTION OF A PETROLEUM PRODUCT FROM A LIQUID

This application is a continuation-in-part of application Ser. No. 557,863, filed Dec. 5, 1983, now U.S. Pat. No. 4,512,890.

TECHNICAL FIELD

This invention relates to the removal of oil and oil-like products from a liquid and, in particular, to the removal of oil and oil-like products from a liquid by means of sorption.

BACKGROUND ART

The difficulty in separating oil or oil-like products from oily liquids has generated several approaches to solve the problem. The problem is particularly troublesome with respect to removal of oil spills from water, especially turbulent water. One approach is to employ skimming devices and processes. One problem with this method is that water is often skimmed off with the separated oil, thereby necessitating further treatment.

Another method of separating the oil from the water is through the use of a sorbent. There are two types of sorbent materials, absorbents and adsorbents. Absorbents soak up oil whereas adsorbents provide a surface for the oil particles to cling to.

Sorbents may be divided into three general classes: (1) natural products, (2) modified or chemically treated natural products, and (3) synthetic or man-made products. U.S. Pat. No. Re. 31,087 to Sohl discloses a fibrous web which comprises a plurality of entangled oleophilic fibers. The fibers are hydrophobic in the presence of oil. The web comprises a plastic, such as nylon or polypropylene, having a large number of interconnected, interstitial spaces for reception and retention of oil to the exclusion of water.

Sorbents of a natural origin may be derived from a mineral source, which may include various clays and other micas and perlite and mixtures thereof. Examples of such sorbents are disclosed in the U.S. Pat. Nos. 4,111,813 to Preus and 3,527,701 to Weiler.

Other sorbents of a natural origin may be derived from vegetative sources, such as bark, as disclosed in the U.S. Pat. No. 3,617,565 to Fahlvik. Wood pulp which has been chemically treated is disclosed as a sorbent in the U.S. Pat. No. 4,343,680 to Field et al. A fibrous sorbent material, such as hemp, is disclosed in the U.S. Pat. No. 2,399,158 to Armaly.

Some sorbents of a natural origin are derived from animal sources as disclosed in the U.S. Pat. No. 3,219,194 to Schwartzwalder et al (i.e. wood) and in the book "Oil Spill Prevention and Removal Handbook", pages 392 through 393, (i.e. feathers) published by the Noyes Data Corporation in 1974.

The use of such sorbent materials by themselves, however, have failed to provide a workable system in removing oil from water. Also, there are relatively high labor costs associated with the acquisition, transportation, stockpiling, deployment, distribution on and working into an oil slick, as well as retrieval and ultimate disposal thereof. Furthermore, such sorbent materials are typically only manually retrievable and only then under calm water conditions. Such products also interfere with equipment which physically removes the oil by clogging such skimming and suction devices. Such sorbent materials may also present a pollution problem on disposal. Many of such sorbent materials also ultimately sink, thereby limiting their usefulness.

The U.S. Pat. No. 4,439,324 to Crotti discloses a method of removing oil from water by using bags which loosely contain feathers. Each bag has a "tea bag" configuration.

Other prior art patents which are generally concerned with the problems addressed by the present invention include the U.S. Pat. Nos. 3,836,000, to Jakubek 3,608,727 to Grutsch et al., and 2,768,913 to Hiler.

DISCLOSURE OF THE INVENTION

An object of the present invention is to provide a low cost oil filter including a plurality of feathers attached to a layer of sheet material in randomly oriented fixed positions wherein the filter is not only oleophilic but also hydrophobic.

Another object of the present invention is to provide an oil filter for separating out oil from an oily liquid including a plurality of feathers attached to a layer of sheet material wherein the filter, and, in particular, the feathers of the filter are not only adsorptive but also have a high oil capacity.

Yet still another object of the present invention is to provide filters in a filter assembly for separating out oil from an oily liquid wherein each filter includes a plurality of feathers attached to a layer of sheet material and wherein each filter is not only retentive (i.e. displays minimal leakage upon saturation) but also is relatively low in cost and may be reused after the oil has been removed therefrom.

Yet a further object of the present invention is to provide a filter including a plurality of feathers attached to a layer of sheet material in randomly oriented fixed positions with the feathers pointing randomly in different directions.

In carrying out the above objects and other objects of the present invention, a filter for separating out oil from an oily liquid comprises a layer of sheet material, a plurality of feathers and an attaching means for securing the feathers in randomly oriented fixed positions on the layer of sheet material with the stems of the feathers pointing in different directions to form a layer of the feathers. The feathers sorb the oil in the liquid upon contact therewith.

A filter assembly for separating out oil from an oily liquid includes a conveyor mounted for movement relative to the liquid and a plurality of filters supported by the conveyor at spaced intervals thereon for movement therewith. Each of the filters comprises a layer of sheet material, a plurality of feathers and attaching means for securing the feathers in randomly oriented fixed positions on the layer of sheet material with the stems of the feathers pointing randomly in different directions to form a layer of the feathers. The feathers sorb the oil in the liquid upon relative movement between the liquid and the conveyor.

Preferably, the layer of sheet material is permeable and is capable of being wound around itself to form multiple overlapping layers of feather-covered sheet material.

The objects, features and advantages of the present invention are readily apparent from the following detailed description of the best mode for carrying out the invention taken in connection with the accompanying drawings.

BRIEF DESCRIPTION OF THE DRAWINGS

FIG. 1 is a perspective view illustrating a filter constructed in accordance with the present invention in its unfolded condition;

FIG. 2 is a perspective view of the filter of FIG. 1 after it has been wound around itself;

FIG. 3 is a sectional, side elevational view of a filtering device utilizing the filter of FIG. 2;

FIG. 4 is a view illustrating a filtering system including a plurality of fluidly interconnected filtering devices of FIG. 3;

BEST MODE FOR CARRYING OUT THE INVENTION

Figure 5:
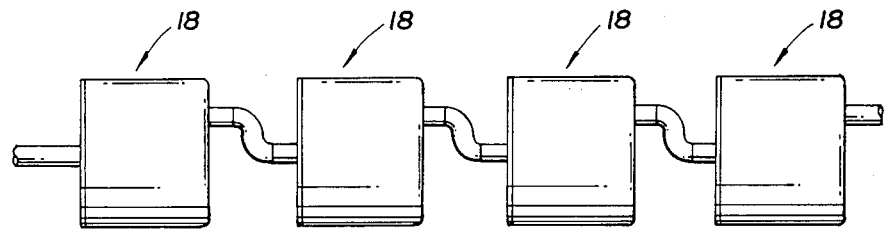
FIG. 5 is a view illustrating a filtering system including a plurality of filtering devices of FIG. 3 interconnected in series.

Referring now to FIG. 1, there is shown in its unfolded condition, a filter constructed in accordance with the present invention, at 10. The filter includes a layer of permeable sheet material which preferably comprises a plastic, flexible net 12. It is to be understood, however, that the net 12 may also be metallic.

A plurality of bird feathers 14, such as chicken or duck feathers, are attached to the net 12 by a glue or other quick-drying adhesive to both sides of the net 12. For example, the net 12 may be dipped in the glue and thereafter the feathers 14 may be blown against the net 12 on both sides thereof.

After the glue has at least partially dried on the net 12, the net 12 is rolled in a helical fashion to the cylindrical form shown in FIG. 2. The net 12 may be wound around about itself, as shown in FIG. 2, or, alternatively, as shown in FIG. 3, may be wound around about a hollow cylindrical member, generally indicated at 16 of a filtering device, generally indicated at 18. The hollow member 16 preferably comprises a perforated hollow metal or plastic cylinder, having a plurality of spaced apertures 20 extending therethrough. The hollow member 16 can also be inserted in the filter after it is wound.

The member 16 is supported within an outer plastic or metal housing, generally indicated at 22, including a top member 24 and a bottom member 26. The top member 24 includes an inlet port 28 for allowing the introduction of an oily liquid therethrough and into the hollow member 20. The bottom member 26 includes an outlet port 30 for allowing the filtered fluid to exit the filtering device 18. The housing 22 preferably holds anywhere between 50 to 100 gallons of oil which has been sorbed by the feathers 14.

The hollow member 16 is supported within the housing 22 between the top and bottom members 24 and 26, respectively, between flat, compressible seals 32. The top and bottom members 24 and 26, respectively, are removably held together in any well-known fashion to permit the removal of the filter 10 from the housing 22 when the filter 10 is saturated with oil. The filter 10 may thereafter be washed of oil by squeezing and/or air blowing and replaced within the housing, thereby allowing the oil to be recaptured for use. Alternatively, the filter may be installed and used as an oily base or combusted to provide a source of heat.

Referring now to FIG. 4 and FIG. 5, there are shown two different configurations or systems of fluidly interconnected filtering devices, such as the filtering device 18, for separating out oil from an oily liquid passed therethrough. As shown in FIG. 4, the uppermost filtering devices 18 are connected in parallel and the fluid communicated through each of the filtering devices 18 is controlled by inlet and outlet valves 34 and 36, respectively. The valves 34 and 36 permit the removal of a certain filter or filters from their respective housings without affecting the filtering operation performed by the other filtering devices.

Referring now to FIG. 5, a plurality of the filtering devices 18 are shown connected in series to perform successive stages of filtering. The system may be periodically shut down to replace those filters which are close to saturation. Also, during a shut-down the filters may be interchanged among the various devices.

Figure 6:
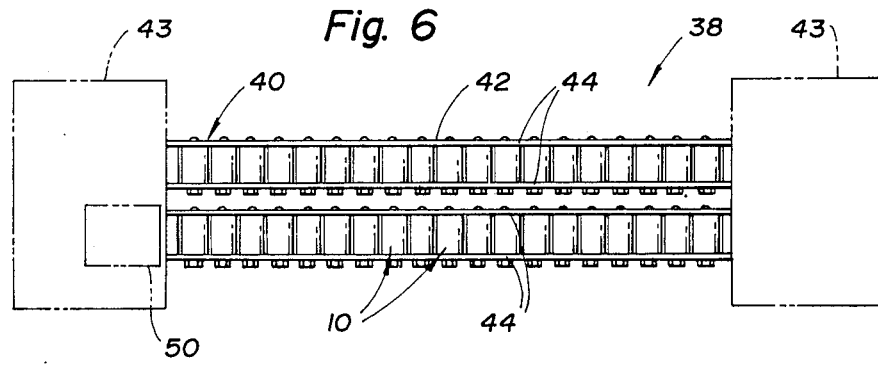
FIG. 6 is a view illustrating a filter assembly including a conveyor extending between a pair of structures for removing oil from a liquid body.
Figure 7:
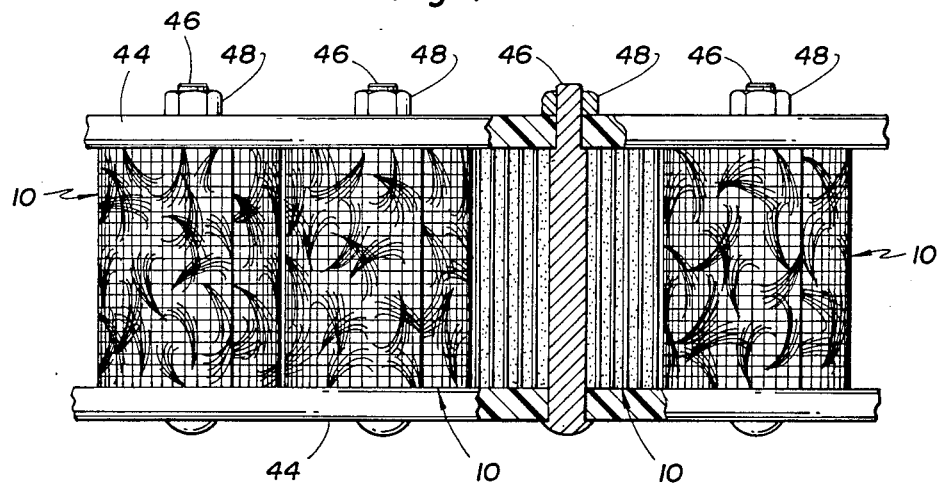
FIG. 7 is an enlarged view, partially broken away and in cross section, showing the interconnection of the filters to the conveyor of the assembly.
Figure 8:
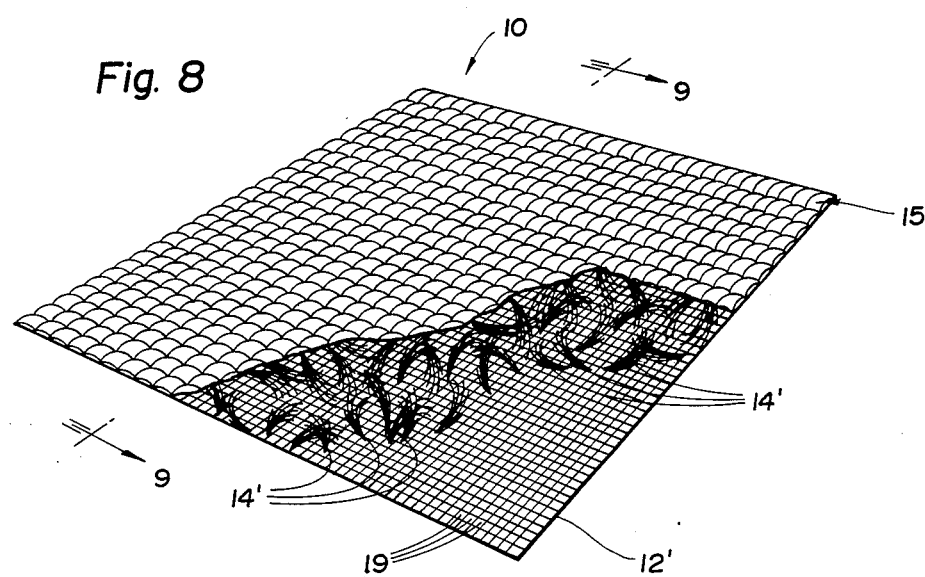
FIG. 8 is a perspective view illustrating a second embodiment of a filter constructed in accordance with the present invention.

Referring now to FIG. 6, there is illustrated a filter assembly, generally indicated at 38, for separating oil from oily liquids, such as by removing an oil slick from the surface of a body of water. The assembly 38 includes a conveyor, generally indicated at 40, including an endless chain 42 which extends between a pair of structures 43 which may comprise a pair of boats or a boat and an underwater mechanism. The chain 42 includes a pair of cables 44 spaced apart by mounting bolts or supports 46 as best shown in FIG. 7. The mounting supports 46 are removably connected to the cables by nuts 48. In turn, a filter such as the filter 10 as shown in FIG. 2 is disposed about each mounting support 46 for sorbing the oil in the liquid upon movement of the conveyor chain 42 between the two structures 43. Onboard the boat structure 43 there is schematically shown a squeezing and drive mechanism at 50 for the chain 42 which may include a pair of rotating wheels to squeeze each of the filters 10 to release the sorbed oil contained therein. Such a squeezing mechanism is shown in the U.S. Pat. No. 3,608,727 to Grutsch. Other such squeezing and drive mechanisms are well-known in the art and need not be described.

Referring now to FIGS. 8 through 11, there is shown a second embodiment of a filter constructed in accordance with the present invention at 10'. The filter 10' includes a layer of permeable sheet material which preferably comprises a plastic, flexible net 12'. It is to be understood, however, that the net 12' may comprise most any material that is flexible in the application as described.

A plurality of bird feathers 14', such as duck or chicken feathers, are attached and secured to the net 12' by a retaining layer 15 of fibrous material, such as fibrous polyester. Portions 17 of the retaining layer 15 extend through the feathers 14' and the apertures 19 formed in the flexible net 12' to mechanically secure the feathers 14', the net 12' and the retaining layer 15 all together.

Figure 9:
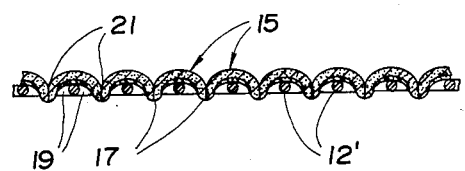
FIG. 9 is an enlarged, side elevational view taken along line 9—9 of FIG. 8, partially broken away and in cross section.
Figure 10:
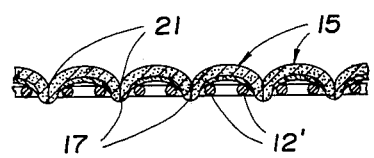
FIG. 10 is a view similar to FIG. 9 wherein the layers of the filter are interconnected in a different fashion.
Figure 11:
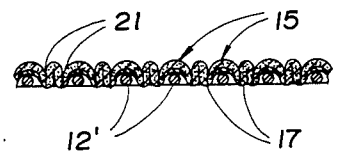
FIG. 11 is a view similar to FIGS. 9 and 10 wherein the layers of the filter are interconnected in yet still another fashion.

As shown in FIG. 9, substantially all of the apertures 19 contain such portions 17. However, as shown in FIG. 10, the portions 17 could extend through substantially every other aperture 19. The most secure connection between the layers can be achieved as shown in FIG. 11 by having substantially two or more portions 17 extend through each aperture 19.

The resulting filter 10' is made by first placing the feathers 14' on the net 12'. Then the retaining layer 15 is placed over the feathers 14'. Then, preferably, a bed of reciprocating needles (not shown) passes through all three layers thereby pushing the portions 17 of the retaining layer 15 through the feathers 14' and the net 12'. In this way, dimples 21 are formed in the top surface of the retaining layer 15 while the portions 17 of the retaining layer 15 extend from the bottom surface of the net 12'. The feathers 14' are secured to the net 12' and the retaining layer 15 in randomly oriented fixed positions with the stems of the feathers 14' pointing randomly in different directions.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A filter for separating oil from an oily liquid, said filter comprising:
    a layer of sheet material permeable to the oily liquid;
    a plurality of unconnected feathers for sorbing the oil from the oily liquid; and
    attaching means for securing said feathers in randomly oriented fixed positions on the layer of sheet material with the stems of the feathers pointing randomly in different directions to form a layer of said feathers, wherein the attaching means comprises a second retaining layer located on the opposite side of the feathers as the layer of sheet material, the second layer including portions extending through the feathers and the other layer to secure the feathers and layers to each other.

2. The filter as claimed in claim 1 wherein the layer of sheet material is perforate, and the retaining layer constituting said one layer and having the portions thereof extending through the feathers and the perforated layer.

3. The filter as claimed in claim 2 wherein the layer of sheet material is formed with a plurality of perforations and wherein said portions extend through substantially all of said perforations.

4. The filter as claimed in claim 3 wherein at least one of said perforations has more than one of said portions extending therethrough.

5. The filter as claimed in claim 2 wherein said retaining layer comprises a layer of fibrous material.

6. The filter as claimed in claim 5 wherein said retaining layer comprises a layer of polyester material.

7. A filter assembly for separating out oil from an oily liquid, said assembly comprising:
    a conveyor mounted for movement relative to the liquid; and
    a plurality of filters supported by said conveyor at spaced intervals thereon for movement therewith, each of said filters including:
    a layer of sheet material permeable to the oily liquid;
    a plurality of unconnected feathers for sorbing the oil from the oily liquid; and
    attaching means for securing said feathers in randomly oriented fixed positions on the layer of sheet material with the stems of the feathers pointing randomly in different directions to form a layer of said feathers wherein the attaching means comprises a second retaining layer located on the opposite side of the feathers as the layer of sheet material, the second layer including portions extending through the feathers and the other layer to secure the feathers and layers to each other.

8. The assembly as claimed in claim 7 including means operatively associated with said conveyor for removing oil from each of the filters upon movement of said conveyor.

9. A filter for separating oil from an oily liquid, said filter comprising:
    a layer of sheet material permeable to the oily liquid;
    a plurality of unconnected feathers for sorbing the oil from the oily liquid; and
    attaching means for securing said feathers in randomly oriented fixed positions on the layer of sheet material with the stems of the feathers pointing randomly in different directions to form a layer of said feathers, wherein the attaching means comprises a fibrous retaining second layer located on the opposite side of the feathers as the layer of sheet material, the second layer including a plurality of portions extending through the feathers and the layer of sheet material to secure the feathers and the layers to each other and wherein the second layer has a like plurality of dimples formed on its outer surface corresponding to said plurality of portions.

10. The filter as claimed in claim 9 or claim 2 wherein said sheet material comprises a netting.

11. The filter as claimed in claim 9 or claim 2 wherein said sheet material is flexible.

12. The filter as claimed in claim 9 or claim 2 wherein said filter comprises a plurality of overlapping layers of said feather-covered sheet material.

13. The filter as claimed in claim 9 or claim 2 wherein said layers of feathers and sheet material comprise a generally cylindrical structure.

14. The filter as claimed in claim 9 or claim 2 wherein said layer of sheet material is substantially continuous and is wound around itself to form multiple overlapping layers of feather-covered sheet material.

15. The filter as claimed in claim 9 or claim 2 wherein said layer of sheet material is substantially continuous and is folded over itself to form multiple overlapping layers of feather-covered sheet material.

* * * * *